J. SCHNEIDER.
CLUTCH.
APPLICATION FILED MAR. 18, 1909.

931,500.  Patented Aug. 17, 1909.

WITNESSES
Edward Thorpe
E. B. Marshall

INVENTOR
John Schneider
BY
ATTORNEYS

UNITED STATES PATENT OFFICE.

JOHN SCHNEIDER, OF ANN ARBOR, MICHIGAN.

CLUTCH.

No. 931,500.  Specification of Letters Patent.  Patented Aug. 17, 1909.

Application filed March 18, 1909. Serial No. 484,085.

*To all whom it may concern:*

Be it known that I, JOHN SCHNEIDER, a citizen of the United States, and a resident of Ann Arbor, in the county of Washtenaw and State of Michigan, have invented a new and Improved Clutch, of which the following is a full, clear, and exact description.

My invention relates to clutches, and it has for its object to provide one which will permit of the ready engagement and disengagement of the drive and driven shafts, with automatic means which will more securely connect the two shafts should there be any slip from the wearing of the parts after the clutch has been thrown into operative position.

Still other objects of the invention will appear in the following complete description.

In this specification I will describe the preferred form of my invention, the scope of the invention being defined in the appended claims.

Reference is to be had to the accompanying drawings forming a part of this specification, in which similar characters of reference indicate corresponding parts in all the views.

Figure 1:
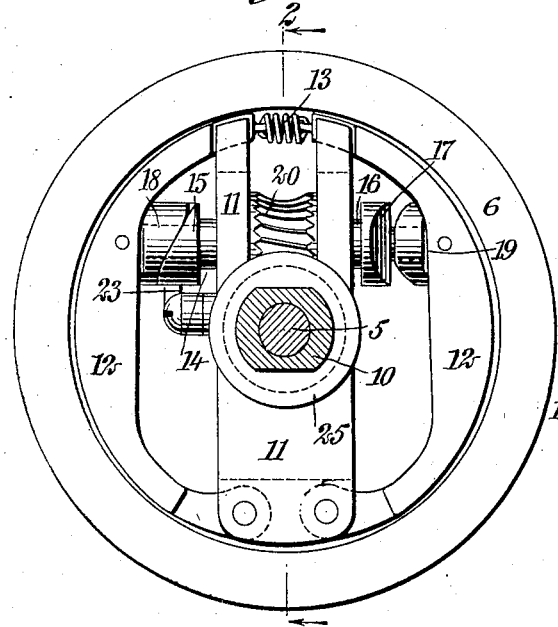
Figure 2:
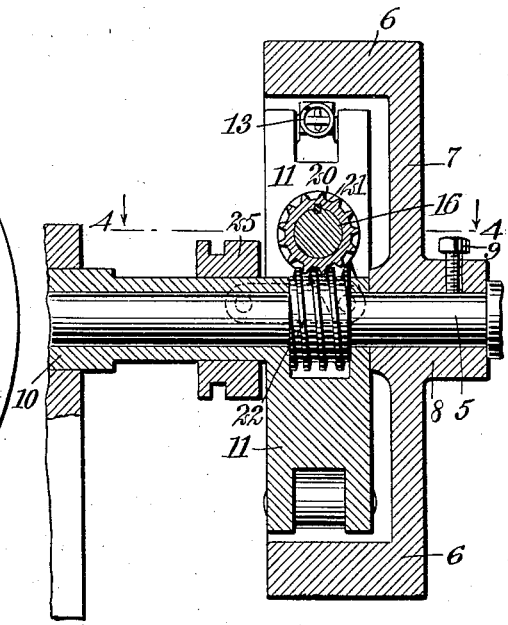
Figure 3:
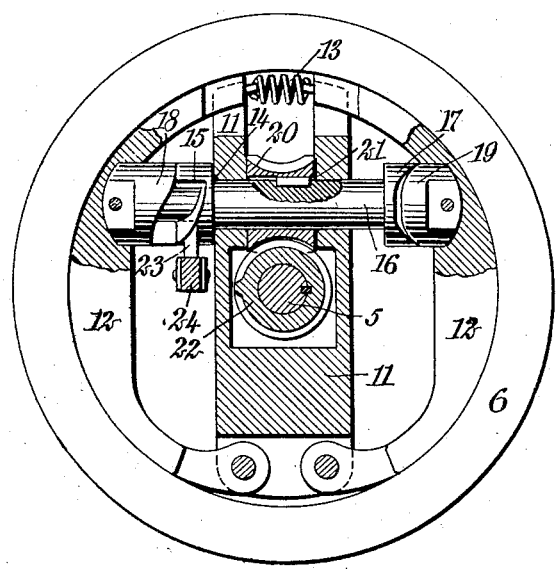
Figure 4:
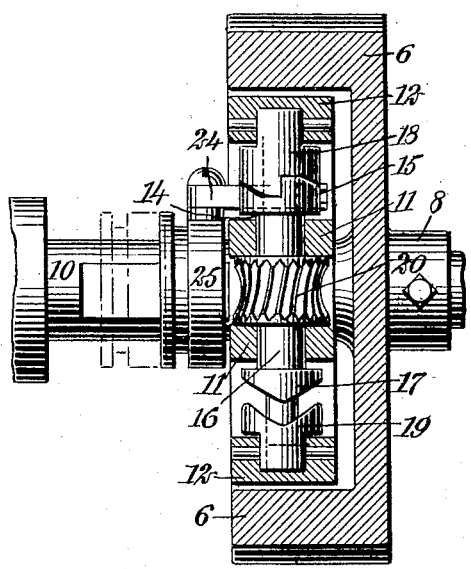

Figure 1 is a front elevation of the clutch;
Fig. 2 is a sectional view on the line 2—2 of Fig. 1; Fig. 3 is a view similar to that shown in Fig. 1, but with a number of the parts in section to show clearly the construction; and Fig. 4 is a sectional view on the line 4—4 of Fig. 2.

By referring to the drawings it will be seen that the shaft 5, which is preferably the driving shaft, is journaled in bearings. To this shaft is secured a collar 6, which has a head 7 integral with a sleeve 8 disposed on the said shaft 5, the sleeve 8 having a set screw 9, which passes therethrough and engages the shaft 5 to hold the collar 6 so that it will rotate with the said shaft. On the said shaft 5 is mounted at one side of the collar 6 a hollow shaft 10, to which is secured a body 11, disposed within the collar 6. This body 11 has friction bands 12 pivoted to it, these friction bands 12 being disposed in close proximity to the interior of the collar. A spring 13 connects the free terminals of the friction bands 12, to pull them yieldingly away from the collar 6. A shaft 16 is disposed through the body 11, there being a shoulder 14 on the shaft 16 at one side of the body 11, the diameter of the shaft 16 being less beyond the said shoulder, and on this portion of the shaft 16 is disposed a cam 15. At the other end of the shaft 16 is secured a cam 17. Cam blocks 18 and 19 are secured to the friction bands 12 opposite the cams 15 and 17 respectively.

There is an opening in the body 11, and in this opening is disposed worm gear 20, which is keyed to the shaft 16, the latter, however, being adapted to slide relatively to the worm gear 20, as the slot in the worm gear 20 in which the key 21 is disposed, is much longer than the said key 21 which is secured to the shaft 16. The terminals of the shaft 16 project in openings in the cam blocks 18 and 19. On the shaft 5 is secured worm 22, which engages the worm gear 20.

When the clutch is not in operative position the cam 17 is disposed away from the cam block 19, so that it will not engage therewith when the shaft 16 is rotated. To the cam 15 is secured an arm 23, which is connected by means of a link 24 with a collar 25, disposed on the hollow shaft 10.

In using my invention, when the shaft 5 is rotated, the worm 22 will rotate the worm gear 20 and the shaft 16 and the cam 17, which is mounted thereon, but inasmuch as the cam 17 is disposed away from the cam block 19, it will not operate the means for throwing out the friction bands 12, the cam 15 not being secured to the shaft 16. When, however, the cam 15 is thrown into engagement with the cam block 18 and is pressed inwardly by its rotation relatively to the said cam block 18, it will tend to force the friction band 12 to which the cam block 18 is secured, outwardly, and it will also press against the shoulder 14 thereby moving the shaft 16 so that the cam 17 will engage the cam block 19 and will force the friction band 12 to which it is secured into engagement with the collar 6.

It is my purpose to so mount the parts, that when the cam 15 is rotated by means of the collar 25, the link 24 and the arm 23, it will force the cam 17 by means of the shaft 16, firmly against the cam block 19, thereby pushing outwardly both of the friction bands 12. When, however, the parts have become worn, there would naturally be some slip between the friction bands 12 and the collar 6, and this is provided for by means of the worm gear 20 and the worm 22, for when the cam 15 has been rotated to an operative position and there is any slip between the shaft 5 and the hollow shaft 10, the worm 22 will rotate the worm gear 20, thereby rotating the shaft 16 and forcing the cam 17 more firmly into engagement with the cam block 19 and thereby forcing the friction bands 12 into firm contact with the collar 6.

Having thus described my invention, I claim as new and desire to secure by Letters Patent:

1. In a clutch, two shafts, one of which is adapted to rotate independently of the other, a collar secured to one of the shafts having an annular flange concentric with the shaft, friction bands connected with the other shaft and disposed within the annular flange, means for moving the friction bands into engagement with the annular flange, means for operating said means, and independent means adapted for automatically moving the first named means when it has been moved into what is normally an operative position and there is slip between the two shafts.

2. In a clutch, two shafts, one of which is adapted to rotate independently of the other, a collar on one of the shafts, friction bands adapted to contact with the collar, a body connecting the friction bands with the other shaft, cam blocks supported on the friction bands respectively, cams for engaging the cam surfaces of the cam blocks, means for supporting the cams on the body, means for rotating the cams, and independent means for further actuating the last named means when it has been operated and there is slip between the two shafts.

3. In a clutch, two shafts, one of which is adapted to rotate independently of the other, a collar on one of the shafts, a body secured to the other shaft, friction bands pivoted to the body, the friction bands being disposed in close proximity to the collar, means for yieldingly holding the friction bands away from the collar, cam blocks supported on the friction bands respectively, cams for engaging the cam surfaces of the cam blocks, means for supporting the cams on the body, means for rotating the cams, and independent means adapted for automatically further actuating the last named means when it has been operated and there is slip between the two shafts.

4. In a clutch, two shafts, one of which is adapted to rotate independently of the other one of the shafts having gear teeth thereon, means for detachably connecting the two shafts, to prevent the rotation of one independently of the other, a third shaft, with gear teeth thereon which mesh with the first named gear teeth, and bearings for the third shaft, secured to the other of the two shafts, the gearing being adapted to further operate the said means when they have been moved to what is normally an operative position and there is slip between the two shafts.

5. In a clutch, two shafts, one of which is adapted to rotate independently of the other, a collar on one of the shafts, a body secured to the other shaft, friction bands mounted on the body, adapted to engage the collar, a shaft journaled to slide in the body, a cam mounted on the last-named shaft near one of its ends, means for rotating the cam to shift the last named shaft laterally, a cam block secured to one of the friction bands, with which the cam is adapted to engage, a cam mounted near the other end of the last named shaft, a cam block on the other friction band, with which the last named cam is adapted to engage, and a gearing connecting the shaft with the collar and the hollow shaft.

6. In a clutch, two shafts, one of which is adapted to rotate independently of the other, a collar mounted on one of the shafts, a body mounted on the other shaft, friction bands supported on the body and adapted to have frictional engagement with the collar, cam blocks mounted on the friction bands respectively, a shaft journaled in the body, a cam mounted on the shaft near one of its ends, adapted to engage one of the cam blocks, means by which the cam is adapted to shift the first named shaft laterally, a cam mounted near the other end of the last named shaft, adapted for engaging the other cam block, and means for rotating the first named cam.

7. In a clutch, two shafts, one of which is adapted to rotate relatively to the other, a collar mounted on one of the shafts, a body mounted on the other shaft, friction bands supported on the body and adapted to have frictional engagement with the collar, cam blocks mounted on the friction bands respectively, a shaft journaled in the body, a cam mounted on the last named shaft near one of its ends, adapted to engage one of the cam blocks, means by which the cam is adapted to shift the last named shaft laterally, a cam mounted on the last named shaft near its other end, adapted to engage the other cam block, means for rotating the first named cam, and means for rotating the last named shaft when one of the said two shafts rotates relatively to the other.

8. In a clutch, two shafts, one of which is adapted to rotate relatively to the other, a collar mounted on one of the shafts, a body mounted on the other shaft, friction bands supported on the body and disposed in close proximity to the collar, cam blocks mounted on the friction bands respectively, a shaft journaled on the body, a cam mounted on the last named shaft near one of its ends, adapted to engage one of the cam blocks, means by which the cam is adapted to shift the last named shaft laterally, a cam mounted on the last named shaft near its other end, adapted to engage the other cam block, a lever secured to the first named cam, a sleeve mounted to slide on one of the said two shafts, and a link connecting the lever and the collar.

9. In a clutch, two shafts, one of which is adapted to rotate relatively to the other, a collar mounted on one of the shafts, a body mounted on the other shaft, friction bands supported on the body and disposed in close proximity to the collar, cam blocks mounted on the friction bands respectively, a shaft journaled on the body, a cam mounted on the last named shaft near one of its ends, to engage one of the cam blocks, means by which the cam is adapted to shift the last named shaft laterally, a cam mounted on the last named shaft near its other end, adapted to engage the other cam block, a lever secured to the first named cam, a sleeve mounted to slide on one of the said two shafts, a link connecting the lever and the collar, and gearing connecting the first of the said two shafts and the last named shaft.

10. In a clutch, two shafts, one of which is adapted to rotate relatively to the other, a collar on one of the shafts, a body secured to the other shaft, a friction band mounted on the body adapted to engage the collar, a shaft journaled in the body, a cam mounted on the last named shaft, a cam block secured to the friction band with which the cam is adapted to engage, means to check the movement of the cam away from the cam block, means to rotate the cam, and independent means for further rotating the cam when it has been rotated and there is slip between the two shafts.

In testimony whereof I have signed my name to this specification in the presence of two subscribing witnesses.

JOHN SCHNEIDER.

Witnesses:
T. E. WEAVER,
GEORGE N. SEARS.